United States Patent [19]

Meyers et al.

[11] Patent Number: 5,987,470
[45] Date of Patent: Nov. 16, 1999

[54] METHOD OF DATA MINING INCLUDING DETERMINING MULTIDIMENSIONAL COORDINATES OF EACH ITEM USING A PREDETERMINED SCALAR SIMILARITY VALUE FOR EACH ITEM PAIR

[75] Inventors: Charles E. Meyers; George S. Davidson; David K. Johnson; Bruce A. Hendrickson; Brian N. Wylie, all of Albuquerque, N.Mex.

[73] Assignee: Sandia Corporation, Albuquerque, N.Mex.

[21] Appl. No.: 08/918,519

[22] Filed: Aug. 21, 1997

[51] Int. Cl.[6] ................................................... G06F 17/30
[52] U.S. Cl. .................................. 707/102; 707/2; 707/7
[58] Field of Search ................................ 707/1, 102, 2, 707/7

[56] References Cited

U.S. PATENT DOCUMENTS

| | | | |
|---|---|---|---|
| 5,619,709 | 4/1997 | Caid et al. | 395/794 |
| 5,623,679 | 4/1997 | Rivette et al. | 395/773 |
| 5,623,681 | 4/1997 | Rivette et al. | 395/788 |
| 5,930,784 | 7/1999 | Hendrickson | 707/2 |

*Primary Examiner*—Wayne Amsbury
*Assistant Examiner*—Mark Terry
*Attorney, Agent, or Firm*—V. Gerald Grafe

[57] ABSTRACT

A method of data mining represents related items in a multidimensional space. Distance between items in the multidimensional space corresponds to the extent of relationship between the items. The user can select portions of the space to perceive. The user also can interact with and control the communication of the space, focusing attention on aspects of the space of most interest. The multidimensional spatial representation allows more ready comprehension of the structure of the relationships among the items.

15 Claims, 9 Drawing Sheets

(6 of 9 Drawing Sheet(s) Filed in Color)

METHOD OF DATA MINING INCLUDING DETERMINING MULTIDIMENSIONAL COORDINATES OF EACH ITEM USING A PREDETERMINED SCALAR SIMILARITY VALUE FOR EACH ITEM PAIR

This invention was made with Government support under Contract DE-AC04-94AL85000 awarded by the U.S. Department of Energy. The Government has certain rights in the invention.

BACKGROUND OF THE INVENTION

This invention relates to the field of data mining, specifically the exposition of the relationships of database items in large databases.

Large databases are becoming commonplace. The INSPEC database on Dialog had almost 4 million records in one file as of November 1990, where records represent scientific articles, books, and papers. The Institute for Scientific Information maintains a database called SCISEARCH, where one file had almost 11 million records as of July 1991. The American Business Directory database had information on over 10 million companies in May 1995. The CLAIMS/U.S. Patents database provides access to over 2 million patents. Countless other private databases exist, storing information such as employee and student records, addresses, customer profiles, and household buying habits.

Even information not stored as a conventional database can have database-like qualities. For example, individual Web pages contain some information; the aggregation of many Web pages contains a large amount of information. Relationships between Web pages are not explicitly stored as in a database, but can be inferred from referencing among the pages. Other examples include financial transactions, not stored as a conventional database but nonetheless representing a large volume of information, with each item of information potentially related to many other items.

Searching and retrieval systems operating with large databases generally allow retrieval of individual items, or retrieval of sets of items related in some way. For example, some databases allow retrieval of individual items. Other databases allow searching for items containing certain keywords or topical markers. The large size of the database makes it more likely that a user can successfully find and retrieve the desired items.

The large size of the database, however, also makes it less likely that the user can comprehend the relationships among the many items in the database. The user can find individual items, and can find groups of related items. The user can not, however, access the structure of the relationships among the items.

The structure of the relationships among items can convey much useful information. For example, a lawyer can use Shepards to find a linear chain of related cases, but can not see beyond that chain to deduce how the cases relate to other such chains. Other lines of reasoning and rules of law in different areas can grow from a line of cases, or a line of cases can itself grow out of several preceding themes in the law. While the relationships among cases are usually explicit through case citations, the structure of the relationships can not be understood using existing search and retrieval tools.

As another example, scientific papers represent the state of research, and often have explicit relationships to other papers through references. Bibliographies and citation lists can help illuminate relationships in a specific area, but are not sufficient to illuminate the ways fields of research grow together, build on each other, or spawn new fields over time.

For databases containing only a few items, a user can read items, analyze relationships, and draw diagrams to deduce the relationships. Databases with more than a few items have much more information embedded in the relationships, but the relationships are too many and too complex for a user to analyze or comprehend from existing search and retrieval tools. Consequently, there is a need for a process that allows a user to comprehend the structure of relationships among items in databases having many items.

SUMMARY OF THE INVENTION

The present invention provides a process that allows a user to comprehend the structure of relationships among items in large databases. The process transforms the relationships among items in the database to geometric relationships. The structure of the relationships is more readily comprehended when communicated via the resulting geometric relationships.

The process assigns coordinates in a geometric space to each item. The assigned coordinates locate the items in the geometric space so that distance between two items in the geometric space is representative of the relationship between the two items. The process then communicates an aspect of the geometric space. The aspect can include, for example, a map-like rendering displayed on a screen. The process changes a characteristic of the communicated aspect based on the nearby items. For example, the apparent height of a surface of a map-like rendering can represent the number of items located nearby.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a process that allows a user to comprehend the structure of relationships among items in large databases. As used herein, database means any collection of items, at least some of which are related. Examples include scientific papers related by citation lists or common words, patents related by citations, court decisions related by other decisions cited, and financial transactions related by geographic or functional descriptors.

The relationships among items can be transformed to coordinates in a geometric space. The coordinates can be assigned so that the geometric relationships among the locations in the geometric space represent the relationships among the items. For example, the coordinates can be assigned so that proximity in the geometric space represents similarity between items. Closely related items can be placed close together in the geometric space; lesser related items can be placed farther apart in the geometric space. A user can therefore readily comprehend the structure of the relationships among items by examination of the structure of the items as placed in the geometric space.

Figure 1:
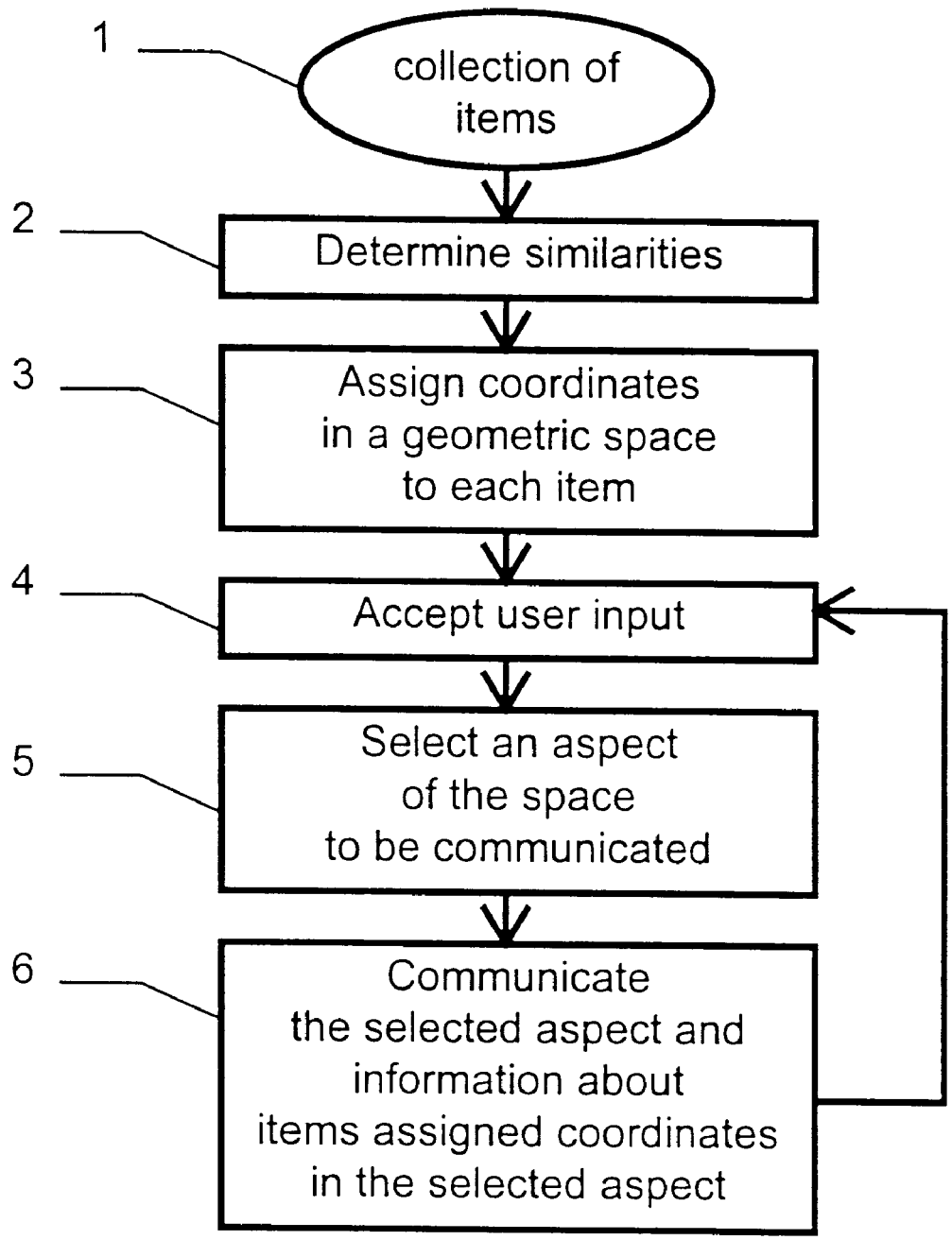
FIG. 1 is a flow diagram of a data mining process according to the present invention.

FIG. 1 is a simplified flow diagram of a data mining process according to the present invention. The process begins with a database or collection of items 1. As used herein, data mining includes the exposition of items and relationships among items in a database, where a database can be any collection of related items. The similarities between the items are then determined 2. Coordinates in a geometric space are then assigned to the items based on the similarities 3 between items. Optionally, user input 4 is accepted to direct the communication of the geometric space, for example, by defining an aspect of the geometric space to be communicated. As used herein, an aspect is any way in which the geometric space can be regarded. Aspects can include, for example, the whole geometric space (communicate the entire geometric space), a geometric subset of the geometric space (communicate only those items assigned coordinates in a certain range), a logical subset of the geometric space (communicate only those items having certain attributes), a temporal subset of the geometric space (communicate only those items having certain time origins), and combinations thereof. An aspect of the space is selected 5. The selected aspect is communicated along with information about the items assigned coordinates in the selected portion 6. Each of the above steps is described in more detail below.

Determining Similarities

Similarities between items can be based on many diverse characteristics of the items. For example, scientific papers can be similar if they contain common keywords. Alternatively, two scientific papers can be similar if one paper cites the other paper, or if they both cite certain other papers. As another example, patents can be similar if they both cite the same other patent. Alternatively, they can be similar if they contain the same keywords, or if they share the same classification. Other characteristics can be used for assessing similarity, including geographic origin, time of origin, institutional origin, and authorship.

In general any attribute that can be shared among items can be the basis for similarity. The structure of the relationships portrayed will reflect the structure of the relationships defined by the chosen similarity metric. Different item characteristics and different application objectives can determine what criteria is useful for determining similarity. Several examples are given below to help illustrate some of the many possibilities. For example, two companies can be similar if they sell or buy from each other. They can also be similar if they are from the same region, in the same industry, have the same credit rating, have similar stock performance, or transact with the same financial institutions. Proteins can be judged to be similar if they contain aligning amino acid sequences, or can be similar if they can be produced by the same process. Web pages can be similar if they reference each other, or can be similar if they share domains.

For the ordination process described below, it is preferable to assign a numeric value as a measure of the similarity between any two items. For simple characteristics, the numeric value can be 0 if the items are not similar and 1 if they are similar. For more complicated characteristics, the numeric value can assume more general values. For example, if scientific papers are defined to be similar if they reference the same other paper, then the numeric value of the similarity between two papers can be the count of the papers cited by both papers.

As an example, the following process can assign a numeric value representing a similarity between a first scientific paper and a second scientific paper:

1. Determine the set N1 of neighbors of the first paper, where a paper is a member of the set N1 if it references the first paper or if it is referenced by the first paper;

2. Determine the set N2 of neighbors of the second paper, where a paper is a member of the set N2 if it references the second paper or if it is referenced by the second paper;

3. Count the number P of papers that are members of both the set N1 and the set N2;

4. Obtain the square root R of the result of multiplying the number of papers in the set N1 by the number of papers in the set N2;

5. Assign the similarity between the first and second papers to be the value obtained by dividing P by R.

The above process considers the number of common references, and also considers the total number of references (so that disproportionately long reference lists do not lead to artificially inflated similarity values). Those skilled in the art will appreciate that many other processes to determine the similarity between two items can also be used with the present invention. For example, other similarity processes can employ variations in the method of combining numbers, variations in the weight given to different attributes characteristic of similarity, and variations in the definition of which attributes contribute to similarity.

Assigning Coordinates

The present invention locates items in a geometric space so that items that are the most related (i.e., have the greatest measure of similarity) are the closest together. Location processes that place related items near each other are suitable for use with the present invention. An example location process is as follows:

1. Begin with a set of items V(i).

2. Assign each item in the set V(i) an index from 1 to n, where n is the number of items. 3. Denote the similarity value between item V(i) and item V(j) as S(i,j). A large similarity value indicates that the two items should be closer together in the geometric space than items having smaller similarity values.

4. Construct a matrix A(i,j):

a) where i≠j, set A(i,j)=−S(i,j)

b) where i=j (on the diagonal of A), set A(i,j)=−(the sum of the other elements in the row), so that every row sums to 0.

5. Determine the n eigenvectors $u_1, u_2, \ldots u_n$, with corresponding eigenvalues $\lambda_1, \lambda_2, \ldots \lambda_n$ sorted from least to greatest.

6. Select d of the eigenvectors, from $u_2$ to $u_{d+1}$, where d is the dimensionality of the geometric space.

7. Locate each item V(i) at the coordinates given by $i^{th}$ element of each of the selected eigenvectors $u_2$ to $u_{d+1}$.

The above process minimizes the error of placing related items far apart, where the error is expressed as the sum, for all pairs of items V(i) and V(j), of the square of the distance between V(i) and V(j) multiplied by the similarity between item V(i) and item V(j) (i.e., S(i,j)). The error function can be expressed as $x^T A x$, where x is the vector of item coordinates. Adding a first constraint that the coordinates sum to zero factors out a constant offset that could otherwise be added to every coordinate without changing the error. Adding a second constraint that $x^T x=1$ eliminates the trivial solution where all the item are placed at the same coordinates.

Minimal values of the error, $x^T Ax$, occur at the eigenvectors of A. A, being a Laplacian matrix, has no negative eigenvalues. The eigenvector associated with the least eigenvalue is therefore the identity vector. The identity vector does not satisfy the second constraint, and so is not used to assign coordinates to the items. Because A is symmetric, all its eigenvectors are orthogonal and so all other eigenvectors satisfy the second constraint. The eigenvector associated with the second least eigenvalue therefore corresponds to coordinates where the total error is minimized. The eigenvectors associated with the next greater eigenvalues correspond to the next lowest error values. The coordinates assigned to items therefore transform the degree of relationship to proximity in the geometric space. The communication of the items in the geometric space will therefore also communicate the relationships among the items.

The values given above for the diagonal elements of A (i.e., A(i,i)) result in a Laplacian matrix. The method also works with a zero diagonal (an adjacency matrix), and with numerous other formulations for the diagonal elements. For example, R. Boppana has described a complicated convex optimization procedure. See Eigenvalues and Graph Bisection: An Average Case Analysis, Proc. $28^{th}$ Annual Symposium on Foundations of Computer Science, IEEE 1987, pp. 280–285. Generally, a Laplacian matrix is preferred to an adjacency matrix. Complex optimizations might provide a better result than a Laplacian matrix, but at the increased cost of performing the optimizations. Alternative diagonal element formulations could require different choices of eigenvectors.

Alternatively, the entire matrix can be negated, resulting in A(i,j)=S(i,j). The method is unchanged except that the selected eigenvectors now correspond to the greatest eigenvalues rather than the least, since negating the matrix negates the eigenvalues.

The coordinate assignments can also be scaled. Qualitatively, the eigenvector corresponding to the least eigenvalue captures the most significant clustering of related entities. Eigenvectors associated with higher eigenvalues capture less important clustering information. Consequently, expanding the geometric space in the dimensions associated with higher eigenvectors can more closely relate the relationships between entities to proximity in the geometric space. The eigenvalues provide a measure of the importance of the clustering information. For example, two eigenvalues very close in value indicate that the associated eigenvectors capture clustering information very close to each other in importance. Two eigenvalues with dissimilar values indicate that the associated eigenvectors capture clustering information of dissimilar importance. Accordingly, the assigned coordinates can be scaled by a function of the associated eigenvalue, for example, by the square root of the eigenvalue, the eigenvalue, or the square of the eigenvalue.

Figure 2:
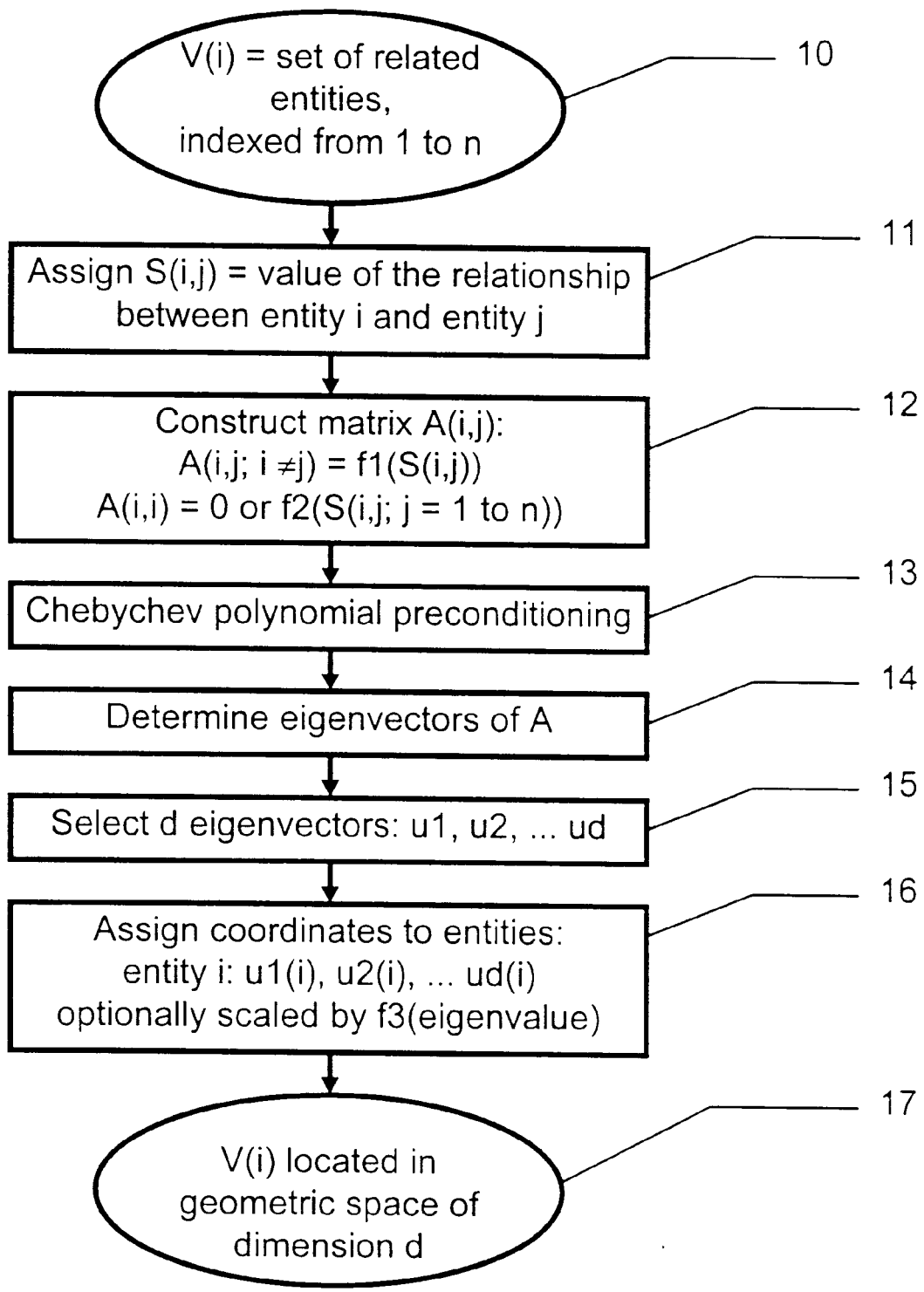
FIG. 2 is a flow diagram of coordinate assignment according to the present invention.

FIG. 2 is a flow diagram of a process coordinate assignment according to the present invention. The process begins with a set 10 of related items V(i), indexed from 1 to n. A numerical representation of the relationship between each pair of items is computed and assigned to S(i,j) 11. A matrix is then constructed 12, where the off-diagonal elements are assigned values based on the values of S(i,j), and the diagonal elements are assigned values of 0 or based on the values of S(i,j). Optionally, the resulting matrix can be preconditioned 13 such as by Chebychev polynomial preconditioning before finding eigenvectors of the matrix 14. Software such as ARPACK from Rice University can find eigenvectors of the matrix. The software can then select 15 d eigenvectors, where d is the dimension of a geometric space. Each item can then be assigned coordinates 16, where item i is assigned coordinates corresponding to element i in each of the selected eigenvectors, optionally scaled by a function of the corresponding eigenvalue. The result 17 of the process is the plurality of items, located at specific coordinates in a geometric space of dimension d.

User Input

Input from a user can tailor the information displayed to meet the user's specific requirements. For example, user input can direct the selection of an aspect for display, such as a subset of the geometric space. Additionally, user input can direct the display of only items having certain attributes, such as institutional origin or time of origin. Additionally, user input can direct the display of detailed information about items, such as more complete identification of individual items or more detailed display of specific links among items. User input can be accepted from a keyboard, a mouse or other pointing device, voice commands, or any other interface suitable for user interaction. Those skilled in the art will appreciate specific interface software to communicate with specific input devices. Feedback mechanisms such as sound or haptic feedback can make user interaction more intuitive.

User input can select a portion of the space for display, for example by specifying certain regions to display in more detail. User input can also direct the information about the items displayed. Those skilled in the art will appreciate software that can interpret user input and direct display software to perform the functions directed by the user.

Directing the Display of the Geometric Space

The data mining system of the present invention can allow the user to select only certain portions of the database. For example, the user can direct the display of only items with dates in a certain range or with particular origins. The user can direct the display of items with certain dates, then direct the selected data range to vary with time, allowing the user to see the evolution of the database relationships over time. The user can also direct the display of only items with certain attributes. For example, the user can direct the display only of items within a certain distance of a selected item, allowing the user to "zoom in" for more detail in areas of particular interest.

A user can also direct that selected items be displayed with selected attributes (such as color or highlighting). The user can thereby emphasize and de-emphasize certain items, for example those from one institution can be emphasized to illustrate the work of that institution in a given technology. As another example, items with dates before a certain date can be de-emphasized, focusing the user's attention on the most recent items.

The user can also direct that selected information be displayed or suppressed. For example, when viewing a large number of items, the user can direct that only aggregate representations be displayed. When smaller numbers of items are to be viewed, the user can direct that more detail be displayed for each item. For example, names describing groups of items can be displayed when large numbers of items are visible; names of individual items can be displayed when fewer items are visible. Similarities between items can also be displayed, with color or shape corresponding to direction and magnitude of the similarity. Because the display is based on individual items, the user can access any information in the database concerning each item.

Full database connectivity allows for real time user querying to extract additional information. For example, the user can direct the display to highlight papers from a specific institution or country, allowing the user to understand the relationship between sources and research areas. This additional insight can provide guidance for direction of future activity, as well as help identify sources of complementary research, anticipating potential collaborative programs. It can also help identify most likely competitors.

Displaying a Portion of the Geometric Space

The selected characteristics of the geometric space can be displayed via any approach that allows a user to comprehend a representation of a multi-dimensional space. For example, the geometric space can be communicated to the user by displaying a window looking onto a multidimensional landscape. Zooming, panning, tilting, and other display manipulations common to this type of display can be made available to the user. Requests for changes to the display can be routed directly to the database server, and the resulting changes highlighted in the display. The user can thereby focus attention on selected aspects of the structure of the database, and explore the aspect by interaction with the database.

As an alternative to displaying a window looking onto the geometric space, geometric space can be communicated to the user via an immersive environment. The user would then be "in" the geometric space, and able to interact with items and relationships among items. The user can then control the display and interact with the database by voice commands or by selected body movements (e.g., by pointing at an item, turning to look at a part of the space, or pulling controls through the space).

EXAMPLE 1

FIGS. 3(a,b,c,d) show representations generated according to the present invention. The representations are of a database with approximately 8200 documents, obtained by querying for papers relating to nuclear technology from the Physical Sciences database maintained by ISI. The resulting collection of papers was assigned similarity values as discussed above. Each paper was then assigned coordinates in a two dimensional space according to the method described above.

Figure 3A:
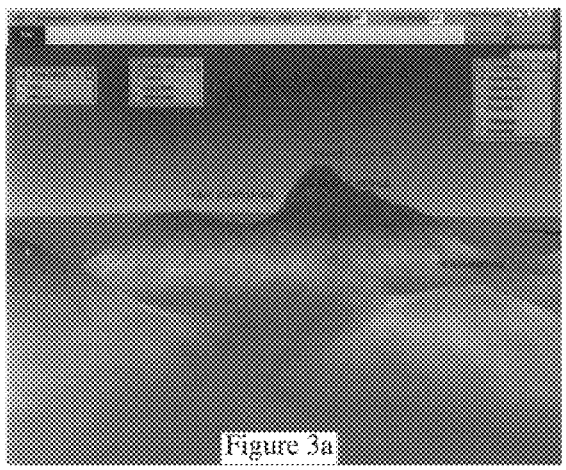
FIGS. 3($a,b,c,d$) are color drawings containing representations of a geometric space corresponding to a database, generated according to the present invention.

FIG. 3a shows a representation of the resulting two dimensional space. In FIG. 3a, the apparent height of the surface above a base plane corresponds to the density of papers assigned coordinates on the portion of the base plane under the surface defined by the two dimensional space. The color of the surface corresponds to the apparent height. The display shows papers concerning "mirror symmetry" and papers concerning "semilocal strings" placed near each other in the geometric space, indicating that the papers were substantially similar. Accordingly, they were assigned coordinates near each other in the two dimensional space. There were also relatively many such papers, represented by the apparent height and color of the surface. Papers treating "liquid scintillator" were somewhat similar to the first two groups, and less similar to papers treating "determination." The descriptive labels and landscape display can make the overall structure of the relationships among the items readily apparent to the user. Note that the descriptive words are for reference convenience, and can be dictated by the user or generated based on the items in the display.

Figure 3B:
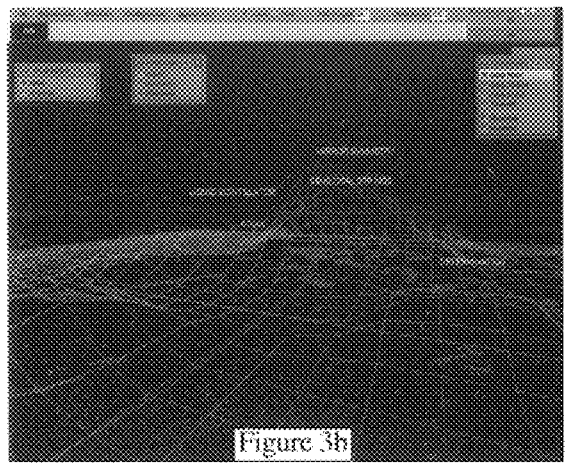

FIG. 3b shows the same portion of the two dimensional space as FIG. 3a, but in a wireframe display. The apparent height of the wireframe surface still corresponds to the local density of papers. Additionally, the location of individual papers in the two dimensional space is represented by individual red markers. The structure of the relationships among individual items can be readily understood by combining the surface height with the relative locations of the individual paper markers.

Figure 3C:
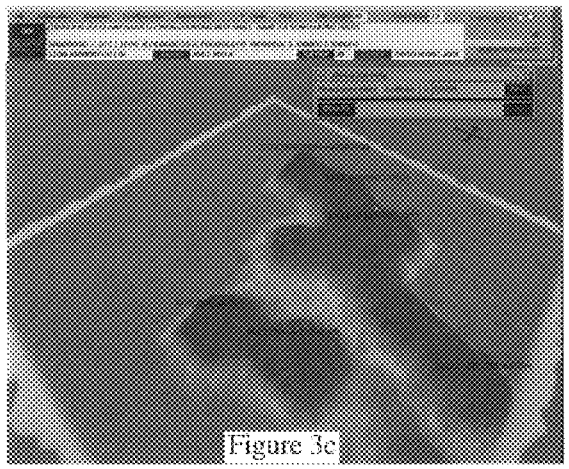

FIG. 3c shows another view of the two dimensional space. The view in FIG. 3c represents a "zoomed" view of the representation in FIG. 3a. More detail about the structure of the relationships is now apparent. For example, research treating "recoil spectrometry" can be seen branching off from one group of papers treating "nuclear spectroscopy." Another group of papers, also treating "nuclear microscopy," is less related to "recoil spectroscopy" but more closely related to "pixel analysis." Representing the items according to the present invention can make it possible for the user to comprehend the complex structure among many scientific papers by viewing and manipulating the display.

Figure 3D:
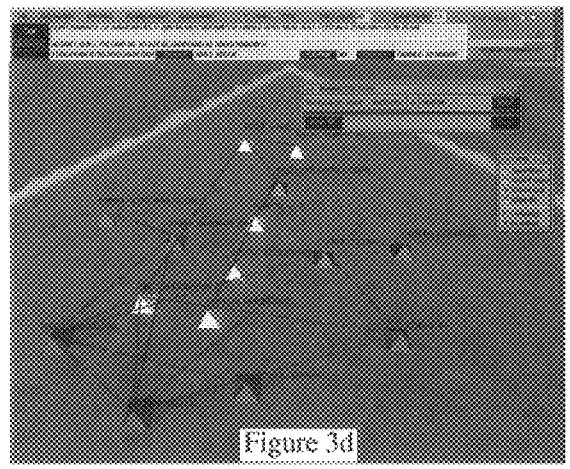

FIG. 3d shows another view of the two dimensional space. The view in FIG. 3d represents a "zoomed" view of the representation in FIG. 3c. The view now shows individual papers, represented as colored triangles. References between papers are shown as colored lines between the corresponding triangles. The coloring of the lines can represent the direction of citation (i.e., which paper cited which other paper). The coloring of the triangles can represent the number of citations to the paper, thereby highlighting those papers cited by many others. Even with a small number of items, the present invention allows more intuitive and more complete user comprehension of the structure of the relationships among the items.

EXAMPLE 2

FIGS. 4(a,b,c,d,e) show representations generated according to the present invention. The representations are of an Analytical Chemistry subset of the Physical Sciences database maintained by ISI. The representations are of a portion of the database, selected to include only those papers published within a moving two year period. Changes in the representation as the two year period moves forward in time illustrate changes in the state of technology over time.

Figure 4A:
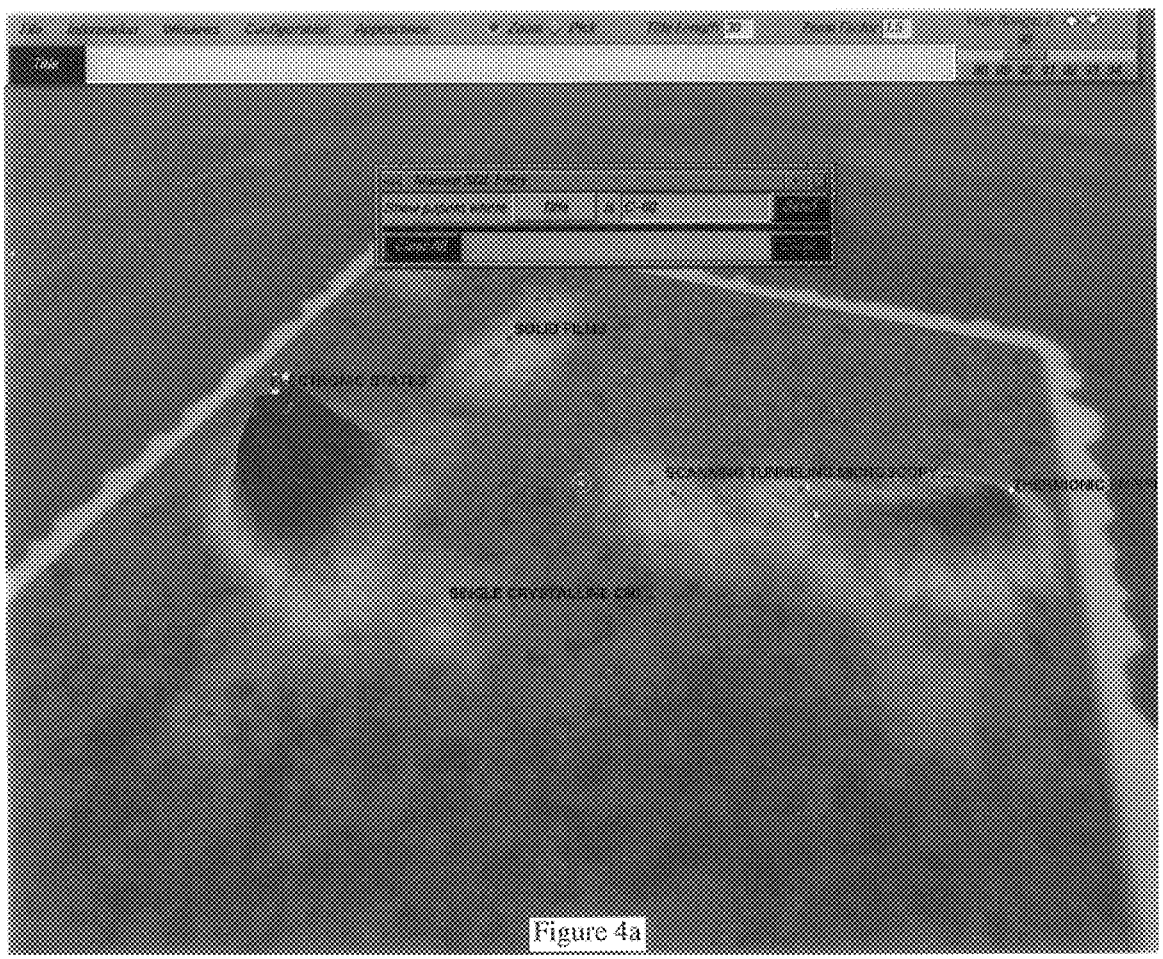
FIGS. 4($a,b,c,d,e$) are color drawings containing representations of the evolution of database item relationships over time, generated according to the present invention.
Figure 4B:
Figure 4C:
Figure 4D:
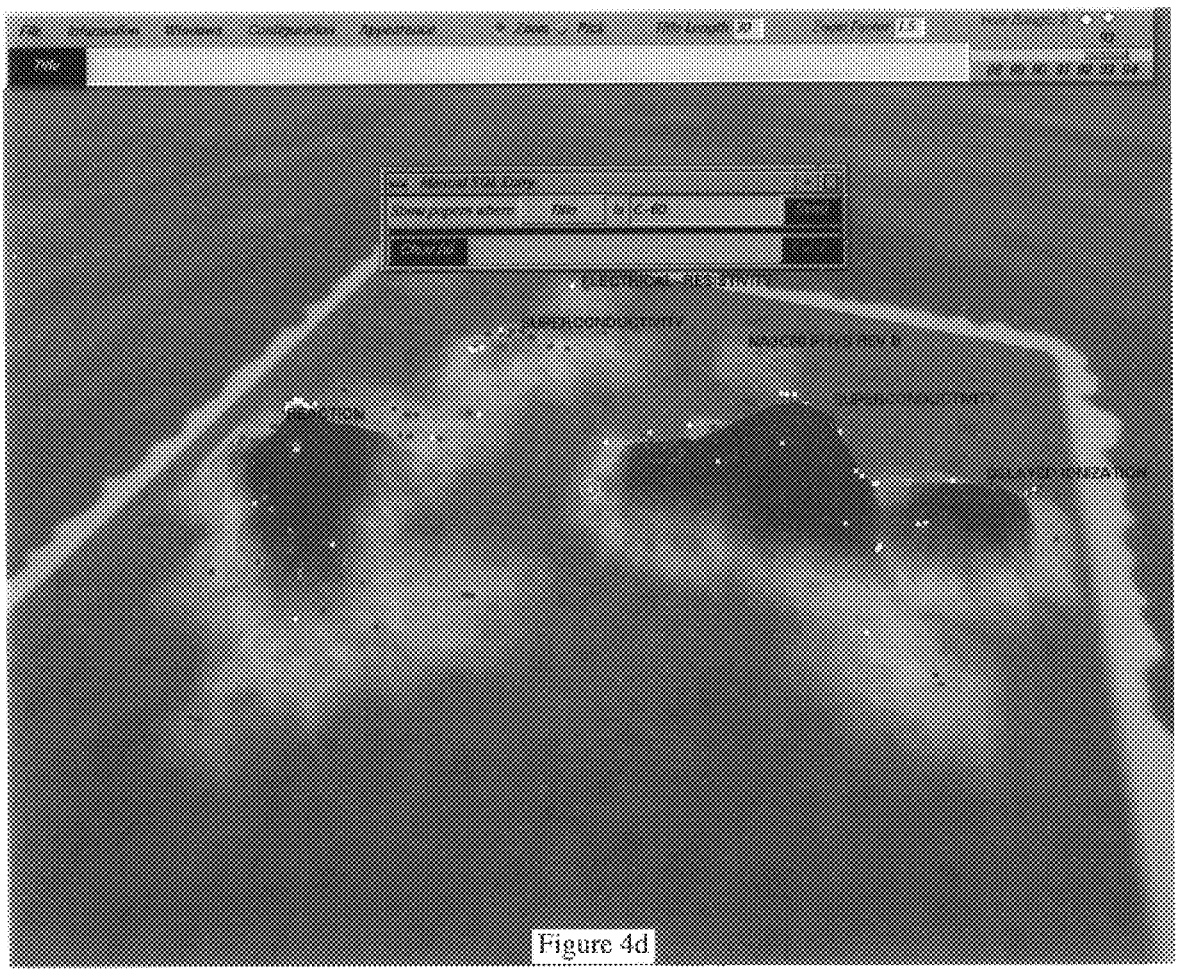
Figure 4E:

FIG. 4a corresponds to a two year period centered at 1990. FIG. 4b corresponds to a two year period centered at 1991. FIG. 4c corresponds to a two year period centered at 1992. FIG. 4d corresponds to a two year period centered at 1993. FIG. 4e corresponds to a two year period centered at 1994. The peak shown at the lower left in FIG. 4a represents a large group of related papers; corresponding to an active area of publication in the corresponding period. The peak grows in FIG. 4b, then begins to increase in breadth and decrease in height as seen in FIGS. 4(c,d,e), representing growth in the technology and eventual branching out into other areas.

A second, smaller ridge in the right portion of FIG. 4a grows in both height and breadth over time. The papers corresponding to the second ridge can thus be seen to have been foundations for the later papers, spawning large number of papers in at least three related groups (the three sub-peaks in FIG. 4e).

Another area of research can be seen first appearing in FIG. 4b, near the top of the display (labeled "C-60"). No clear precursors appear in FIG. 4a, representing an initial foray into a previously unexplored technology area. A relatively few other papers can be seen in the same area in FIGS. 4c and 4d. The color and height of the surface are back to neutral levels in FIG. 4e, representing an area no longer active in publication.

Example System

Figure 5:
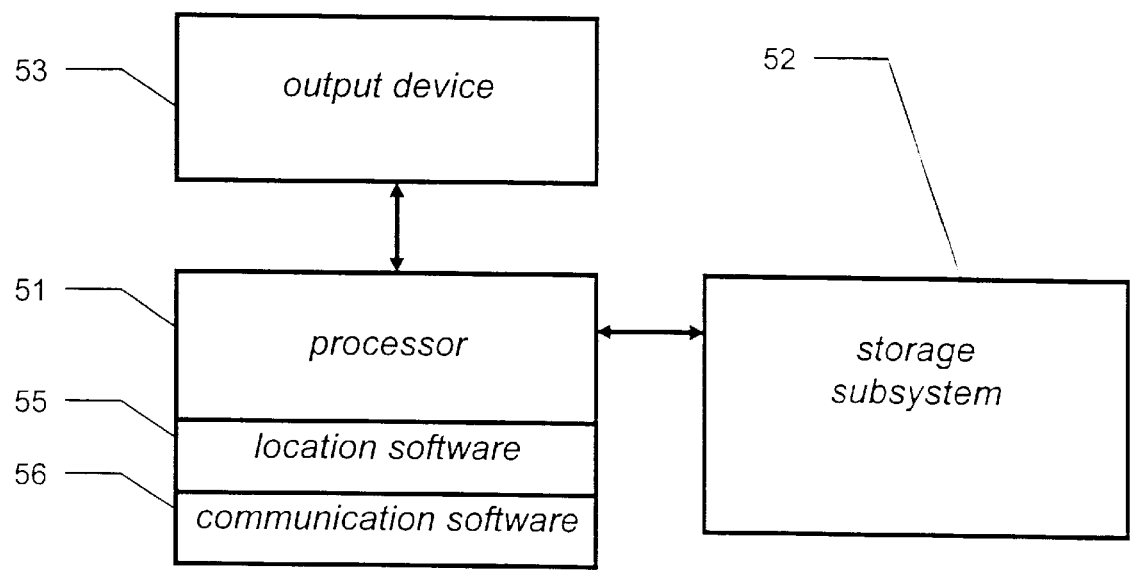
FIG. 5 is an illustration of a computer system suitable for practice of the present invention.

FIG. 5 shows a computer system adapted for use with the present invention. Processor 51 operatively connects with storage subsystem 52 and output device 53. Processor 51 can be, for example, a microprocessor such as those found in personal computers, a system such as those found in workstations, or a plurality of processors operating in parallel. Storage subsystem 52 can be, for example, an optical or electromagnetic disk storage system, a random access memory system, a electromagnetic tape storage system, or networked access to information stored remotely. Output device 53 can be, for example, a conventional computer display screen or a multi-dimensional virtual reality environment. A plurality of items and the relationships therebetween can be stored in storage subsystem 52. Those skilled in the art will appreciate computer software 54 that can direct processor 51 to perform the steps disclosed above for locating the items in a geometric space. After the items are located, additional computer software 55 known to those skilled in the art can direct the communication of the items in the geometric space using output device 53.

The present invention was implemented on a O2 computer from Silicon Graphics, using internal connections to an Oracle 7 database server. The system operated with Silicon Graphics' IRIX 6.3 Unix-based operating system. The user interface was developed using the Tcl/Tk interface language. The O2 computer comprised 256 MB of RAM, a 4 GB external Ultra-wide SCSI 3 disk for the Oracle 7 application, a 2 GB internal Ultra-wide SCSI 3 disk for the system and navigation software, and a R5000 SC processor operating at 185 MHz.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of mining data in a computer-readable database composed of a plurality of related items, wherein the relationship between each pair of related items comprises a scalar similarity value, comprising:
    a) determining coordinates in an n-dimensional space for each item from the scalar similarity values, where n is at least two, and where coordinates are determined so that, for every item pairing, distance in the n-dimensional space between the two items is representative of the scalar similarity value relating the two items; and
    b) communicating an aspect of the n-dimensional space by communicating a representation of the n-dimensional space, where a characteristic of the representation varies with location in the representation based on the items assigned coordinates in the vicinity of the location.

2. The method of claim 1, wherein the step of communicating an aspect comprises displaying the aspect, and wherein the characteristic is chosen from the group consisting of: the color of the displayed representation, the apparent height of a surface of the displayed representation, the brightness of the displayed representation, the apparent texture of a surface of the displayed representation, the intensity of a feedback signal, markers at coordinates assigned to entries, connections between related entries, and combinations thereof.

3. The method of claim 1, wherein the step of assigning coordinates comprises assigning a numeric value to each pairing of items, where the numeric value corresponds to the relationship between the pairing of items.

4. The method of claim 1, further comprising:
    a) accepting input defining desired information concerning at least one item; and
    b) communicating the desired information.

5. A method of mining data in a computer-readable database composed of a plurality of related items, comprising:
    a) assigning coordinates to each item in an n-dimensional space, where n is at least two, and where items are assigned coordinates so that, for every item pairing, distance in the n-dimensional space between the two items is representative of the relationship between the two items, comprising assigning a numeric value to each pairing of items, where the numeric value correspond to the relationship between the pairing of items, wherein each item can include references to other items, and wherein assigning a numeric value to each pairing of items P1 and P2 comprises:
    1) determining a first set of items comprising all the items referenced by item P1;
    2) determining a second set of items comprising all the items references by item P2;
    3) determining the number P of items in the first set that are also in the second set; and
    4) assigning a numeric value to the pair of items P1 and P2 based in the number P; and
    b) communicating an aspect of the n-dimensional space by communicating a representation of the n-dimensional space, where a characteristic of the representation varies with location in the representation based on the items assigned coordinates in the vicinity of the location.

6. The method of claim 5, wherein step d) comprises:
    a) taking the square root R of the number of items in the first set multiplied by the number of items in the second set; and
    b) assigning the result of the number P divided by the square root R as the numeric value.

7. A method of mining data in a computer-readable database composed of a plurality of related items, comprising:
    a) assigning coordinates to each item in an n-dimensional space, where n is at least two, and where items are assigned coordinates so that, for every item pairing, distance in the n-dimensional space between the two items is representative of the relationship between the two items, comprising assigning a numeric value to each pairing of items, where the numeric value correspond to the relationship between the pairing of items, comprising:
    1) constructing a square matrix $A(i,j)$, with rank of at least the number of items, where $A(i,j)$=the negative of the numeric value assigned to the pairing of item i and item j, and where $A(k,k)$=the negative of the sum of all the other elements of the row $A(k,x)$;
    2) determining the eigenvectors of A corresponding to the n+1 least eigenvalues; and;
    3) assigning item i coordinates in the n-dimensional space corresponding to element i of each of the eigenvectors determined in the previous step, omitting the eigenvector corresponding to the least eigenvalue; and b) communicating an aspect of the n-dimensional space by communicating a representation of the n-dimensional space, where a characteristic of the representation varies with location in the representation based on the items assigned coordinates in the vicinity of the location.

8. A computer system for communicating a database composed of a plurality of related items, wherein the relationship between each pair of related items comprises a scalar similarity value, comprising:
   a) a storage subsystem;
   b) an output subsystem;
   c) a processing subsystem connected to access the database stored in the storage subsystem and connected to control the operation of the output subsystem;
   d) means for determining coordinates in an n-dimensional space for each item from the scalar similarity values, where n is at least two, and where coordinates are determined so that, for every item pairing, the distance in the n-dimensional space between the two items correlates with the scalar similarity value relating the two items;
   e) means for selecting an aspect of the n-dimensional space; and
   f) means for communicating the selected aspect of the n-dimensional space by communicating a representation of the n-dimensional space, where a characteristic of the representation varies with location in the representation based on the items assigned coordinates in the vicinity of the location.

9. The computer system of claim 8, wherein the means for communicating the selected aspect comprises means for displaying the selected aspect, and wherein the characteristic is chosen from the group consisting of: the color of the displayed representation, the apparent height of a surface of the displayed representation, the brightness of the displayed representation, the apparent texture of a surface of the displayed representation, the intensity of a feedback signal, markers at coordinates assigned to entries, connections between related entries, and combinations thereof.

10. The computer system of claim 8, wherein the means for assigning coordinates comprises means for assigning a numeric value to each pairing of items, where the numeric value corresponds to the relationship between the pairing of items.

11. The computer system of claim 8, further comprising:
   a) means for accepting input defining desired information concerning at least one item; and
   b) means for communicating the desired information.

12. A computer system for communicating a database composed of a plurality of related items, comprising:
   a) a storage subsystem;
   b) an output subsystem;
   c) a processing subsystem connected to access the database stored in the storage subsystem and connected to control the operation of the output subsystem;
   d) means for assigning coordinates in an n-dimensional space to each item, where n is at least two, and where items are assigned coordinates so that the distance in the n-dimensional space between two items correlates with the relationship between the two items;
   e) means for selecting an aspect of the n-dimensional space; and
   f) means for communicating the selected aspect of the n-dimensional space by communicating a representation of the n-dimensional space, where a characteristic of the representation varies with location in the representation based on the items assigned coordinates in the vicinity of the location, wherein the means for assigning coordinates comprises means for assigning a numeric value to each pairing of items, where the numeric value corresponds to the relationship between the pairing of items, wherein each item can include references to other items, and wherein the means for assigning a numeric value to each pairing of items P1 and P2 comprises:
   g) means for determining a first set of items comprising all the items referenced by item P1;
   h) means for determining a second set of items comprising all the items referenced by item P2;
   i) means for determining the number P of items in the first set that are also in the second set; and
   j) means for assigning a numeric value to the pair of items P1 and P2 based on the number P.

13. The computer system of claim 12, wherein the means for assigning a numeric value in d) comprises:
   a) means for taking the square root R of the number of items in the first set multiplied by the number of items in the second set; and
   b) means assigning the result of the number P divided by the square root R as the numeric value.

14. A computer system for communicating a database composed of a plurality of related items, comprising:
   a) a storage subsystem;
   b) an output subsystem;
   c) a processing subsystem connected to access the database stored in the storage subsystem and connected to control the operation of the output subsystem;
   d) means for assigning coordinates in an n-dimensional space to each item, where n is at least two, and where items are assigned coordinates so that the distance in the n-dimensional space between two items correlates with the relationship between the two items;
   e) means for selecting an aspect of the n-dimensional space; and
   f) means for communicating the selected aspect of the n-dimensional space by communicating a representation of the n-dimensional space, where a characteristic of the representation varies with location in the representation based on the items assigned coordinates in the vicinity of the location, wherein the means for assigning coordinates comprises means for assigning a numeric value to each pairing of items, where the numeric value corresponds to the relationship between the pairing of items, wherein the means for assigning coordinates comprises:
   g) means for constructing a square matrix $A(i,j)$, with rank of at least the number of items, where $A(i,j)$=the negative of the numeric value assigned to the pairing of item i and item j, and where $A(k,k)$=the negative of the sum of all the other elements of the row $A(k,x)$;
   h) means for determining the eigenvectors of A corresponding to the n+1 least eigenvalues; and
   i) means for assigning item i coordinates in the n-dimensional space corresponding to element i of each of the eigenvectors determined in the previous step, omitting the eigenvector corresponding to the least eigenvalue.

15. A method of using a computer to facilitate data mining of a database composed of a plurality of related items, wherein the relationship between each pair of related items comprises a scalar similarity value, comprising:

a) using the computer to determine coordinates for each item in an n-dimensional space from the scalar similarity values, where n is at least two, and where coordinates are determined so that, for every item pairing, distance in the n-dimensional space between the two items is representative of the scalar similarity value relating the two items; and b) using the computer to communicate an aspect of the n-dimensional space by displaying a representation of the n-dimensional space, where a characteristic of the representation varies with location in the representation based on the items assigned coordinates in the vicinity of the location.

* * * * *